(12) United States Patent
Kalweit et al.

(10) Patent No.: US 6,439,196 B1
(45) Date of Patent: Aug. 27, 2002

(54) ELECTRONIC CONTROL DEVICE FOR OPTIONAL CONTROLLING OF DIFFERENT TYPES AND OPERATING MODES OF INTERNAL COMBUSTION ENGINES

(75) Inventors: Dieter Kalweit, Schorndorf; Sven Merkle, Stuttgart; Ralf Wörner, Weil der Stadt, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/891,771

(22) Filed: Jun. 26, 2001

(30) Foreign Application Priority Data

Jun. 28, 2000 (DE) .......................... 100 31 552

(51) Int. Cl.⁷ .......................... F02D 41/14; F02D 43/00
(52) U.S. Cl. ........................ 123/399; 123/295
(58) Field of Search ................. 123/350, 399, 123/305, 295, 435; 701/104

(56) References Cited

U.S. PATENT DOCUMENTS 3,812,401 A * 5/1974 Radin ..................... 317/40 R
5,904,128 A * 5/1999 Shimada et al. ........ 123/339.12

FOREIGN PATENT DOCUMENTS

| DE | 41 11 023 | 10/1992 |
| DE | 197 38 614 | 3/1998 |
| DE | 198 50 586 | 5/2000 |

OTHER PUBLICATIONS

Moser et al., "Benzin–Direkteinspritzung–eine neue Harausforderung für zukünftige Motorsteuerungssysteme", MTZ Motortechnische Zeitschrift 58 (1997) 9, pp. 458–464, An English Language translation is provided.

* cited by examiner

Primary Examiner—Tony M. Argenbright
Assistant Examiner—Johnny H. Hoang
(74) Attorney, Agent, or Firm—Kenyon & Kenyon

(57) ABSTRACT

An electronic control device for the optional control of various types and operating modes of internal combustion engines includes a calculation device configured to calculate the respectively required manipulated quantities, including at least the manipulated variable (Ti) for the predetermination of the fuel quantity to be injected and the manipulated variable (α) for the predetermination of the throttle valve position of the throttle valve in the intake pipe, dependent on respectively required input parameters, including at least the desired quantity of heat (WM). A switchover device is configured to allocate, dependent on the operating mode, the respectively required input parameters and/or quantities derived therefrom as input quantities for the respectively required calculation device. A single type of control device may be manufactured, in large piece counts and with simplified warehousing, for variable possibilities of application. The adaptation to the respective type of engine or operating mode may occur through simple adaptation with the aid of a switchover device.

10 Claims, 1 Drawing Sheet

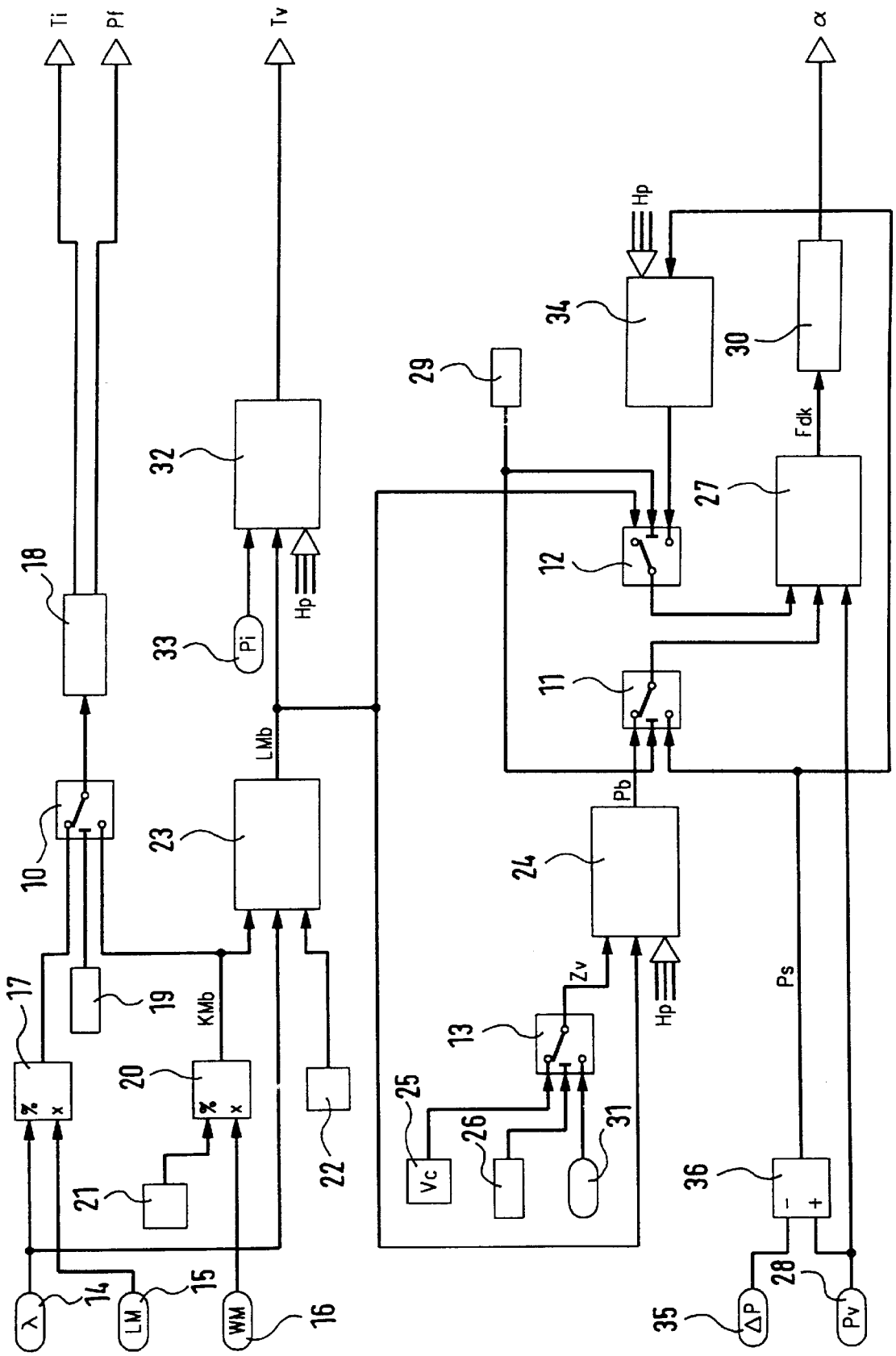

ELECTRONIC CONTROL DEVICE FOR OPTIONAL CONTROLLING OF DIFFERENT TYPES AND OPERATING MODES OF INTERNAL COMBUSTION ENGINES

FIELD OF THE INVENTION

The present invention relates to an electronic control device for selectively controlling different types and operating modes of internal combustion engines, for example, conventional SI engines having fixed cylinder volumes, SI engines having variable cylinder volumes, SI engines having fully variable valve controlling and/or camshaft actuator, SI engines having direct injection with stratification, or diesel engines. These different engine designs or operating modes each require different engine controlling, with respectively different input parameters and different manipulated quantities or variables at the output side, as well as different computing processes for the determination thereof.

BACKGROUND INFORMATION

In a conventional manner, a separate suitable control device is developed for each specific engine design or each typical operating mode, so that a multiplicity of different control devices are manufactured and must be warehoused as replacement parts. This results in considerable costs for manufacture and warehousing. For each new design, a new control device must be developed.

SUMMARY

It is an object of the present invention to provide an electronic control device that may be adapted rapidly and easily to the widest variety of engine designs and operating modes.

The above and other beneficial objects of the present invention are achieved by providing an electronic control device as described herein.

The advantages of this electronic control device include that it may be adapted rapidly and easily to various engine designs and operating modes, so that in principle only a single design of a control device need be manufactured for all types of internal combustion engines, i.e., combustion engines and operating modes. Although the control device contains components and assemblies that are not required for a specific application, the overall costs are nonetheless reduced through greater piece counts and simpler warehousing. In addition, the control device also offers the possibility of adaptation to future engine designs, because it is designed for all possible types of input parameters and manipulated quantities at the output side.

The adaptation to the respective engine design or to the respective application is achieved through simple automatic or manual adjustment of the switchover device.

A calculating device is provided for predetermining the fuel quantity to be injected, dependent optionally on the measured air-mass flow or on the desired quantity of heat. The switchover between these two alternatives occurs, for example, given the use of stratification or diesel engines, where the desired quantity of heat is used as an input parameter, and for other SI engines, where the measured air-mass flow is used as an input parameter.

The calculating device for predetermining the fuel quantity to be injected may be configured only for predetermining the injection time, or the injection time and the injection pressure, the second alternative being required in stratification or diesel engines.

A conversion device configured to convert the measured air-mass flow values and the desired heat quantity values into corresponding fuel mass values may be provided, a switchover device that may be actuated dependent on the operating mode being provided for the selection between these two fuel mass values as a basis for calculation for the fuel quantity to be injected.

In addition, a calculating device may be provided for predetermining the throttle valve position, dependent optionally on the desired quantity of heat or on the air-mass flow, calculated via an intake or induction pipe model. The application of the first alternative occurs, for example, in conventional SI engines, and the second alternative in stratification or diesel engines, or in SI engines with fully variable valve controlling.

A conversion device configured to convert the desired quantity of heat into a setpoint air-mass flow, and to convert this setpoint air-mass flow into a setpoint intake pipe pressure for calculating the throttle valve position, may be provided. The conversion device may also be configured to increase the variability for converting the setpoint air-mass flow into the setpoint intake pipe pressure, dependent on the cylinder capacity, an operating-mode-dependent switchover device being used for the alternative predetermination of a constant cylinder capacity or of a valve-lift-controlled cylinder capacity.

For controlling SI engines having fully variable valve controlling or having camshaft actuators, a calculating device that may be optionally activated may be provided for the predetermination of the valve control times dependent on the desired quantity of heat. For this purpose, a conversion device may be provided for converting the desired quantity of heat into a setpoint air-mass flow, as well as for converting this setpoint air-mass flow into a cylinder stroke volume for the calculation of the valve control times.

BRIEF DESCRIPTION OF THE DRAWINGS

FIG. 1 is a block switching diagram of a control device of an example embodiment of the present invention.

DETAILED DESCRIPTION

The block switching diagram illustrated in FIG. 1 is in the setting or switching position for controlling conventional SI engines having fixed camshaft control times and constant cylinder volume. This setting occurs with the aid of four switchover devices 10 to 13, which assume the depicted switching positions either manually, i.e., with the aid of switches or switch contacts, or in program-controlled fashion, or controlled in parameter-dependent fashion. As essential input parameters, the measured air/fuel ratio, i.e., the so-called λ value, the measured air-mass flow LM and the desired quantity of heat WM are applied to inputs 14 to 16. The desired quantity of heat WM is conventionally predetermined by the gas pedal of the vehicle in which the SI engine to be controlled is located. A desired torque may also be predetermined corresponding to the desired quantity of heat.

With the aid of a division stage or unit 17, the fuel mass is determined by dividing air-mass flow LM by the λ value, the fuel mass being supplied via switchover device 10 of a calculation stage 18 for the calculation of fuel injection times Ti, control signal Ti being present as an output-side manipulated variable for the injection valves of the SI engine. Calculating stage 18 may, for example, also be configured, alternatively or in addition, as a characteristic map or engine map. The illustrated switching position of switchover device 10 is determined via a control input 19. A corresponding control signal may be produced through a control pin, through a control program command, or in parameter-dependent fashion, for example, as a function of the λ value.

From the signal present at input 16 for the desired quantity of heat, in a second division stage 20 the corresponding fuel mass KMb to be supplied is calculated through division by the value of the specific quantity of heat of the fuel used. The value of the specific heat quantity is stored in a memory 21. The values for fuel mass KMb to be supplied, the λ value, and the stoichiometric air/fuel ratio, stored in a further memory 22, are supplied to a calculation stage 23 for the corresponding air-mass flow LMb that is to be supplied. A characteristic map or a characteristic map supporting may be provided. Air-mass flow LMb determined in this manner is supplied to a further calculation stage 24 for the calculation of intake pipe pressure Pb from this air-mass flow. Additional auxiliary parameters and correction quantities are also present at the input side of this calculation stage 24, such as cylinder volume Zv and further auxiliary parameters Hp, for example, the partial pressure portions of the exhaust gas recirculation, of the water vapor, and of the tank ventilation or fuel tank vent line. Through the position of the switchover device 13, a constant cylinder volume Vc stored in a memory 25 is supplied to the input of calculation stage 14, the position of switchover device 13 being determined by a control input 26. The control signals are formed in a manner corresponding to those for control input 19.

From calculated intake pipe pressure Pb and calculated air-mass flow LMb, which are supplied to a further calculation stage 27 via the two switchover devices 11, 12, in this stage the effective opening surface of throttle valve Fdk is calculated. As a further auxiliary parameter, the measured exit pressure, or pressure before throttle valve Pv, present at an input 28 of the control device, is supplied to this calculation stage 27. The calculation of effective opening surface Fdk occurs via a corresponding program and/or as a function of the characteristic map. The switch positions of the two switchover devices 11, 12 are predetermined via a control input 29. The corresponding control signal is formed in a manner corresponding to the formation of the control signals for control inputs 19 and 26. From the effective opening surface of throttle valve Fdk, in a downstream conversion stage 30 the throttle valve angle is calculated as manipulated variable α for the throttle valve and is supplied to a corresponding output.

All components not described are not required for the controlling of the conventional SI engine and are either deactivated or no corresponding input signals are present, or the formed manipulated quantities are not used.

In an application of the described control device for SI engines having variable cylinder volume, thus, for example, SI engines having cylinder stroke controlled by the camshaft (known as VVT engines or VHS engines), through a corresponding control signal at control input 26, switchover device 13 is placed into the second (not shown) switching position, so that from this point on the variable cylinder volume signal, acquired for example through angular measurement and present at input 31, is supplied to calculation stage 24 as an auxiliary or correction parameter, in place of constant cylinder volume ZV. All other processes and functions described above remain the same.

In the following description, the use of the specified control device is specified for SI engines having fully variable valve controlling (for example, EMVS engines) or for SI engines having camshaft actuator (for example, VLC engines). The formation of manipulated variable Ti for the injection times occurs in unmodified fashion, in the described manner. Through a corresponding control signal at control input 29, the two switchover devices 11, 12 are switched into the respective second switching position (not shown), so that from this point on, calculated air-mass flow LMb can no longer be used for the formation of manipulated variable α for the throttle valve. Switching range 24 to 26, 13, 31 is either deactivated or the formed output signal at the output of calculation stage 24 is not used, because it is blocked by switchover device 11. In this arrangement, calculated air-mass flow LMb is supplied to a further calculation stage 32 for the calculation of a manipulated variable Tv for the valve control times, i.e., in particular for the opening time intervals of the intake valves. In addition, measurement signal Pi, present at an input 33, for the pressure in the intake pipe, as well as, optionally, auxiliary parameter Hp, is supplied to this calculation stage 32. The calculation may again occur in program-controlled fashion and/or as a function of the characteristic map. The stroke volumes for the air, and therefrom manipulated variable Tv, may also first be calculated in a first calculation process.

In order to ensure. a constant intake pipe vacuum, which is functionally necessary, for example, for the tank ventilation, the external exhaust gas recirculation, etc., associated throttle valve angle α is derived as a function of the absolute pressure, i.e., for example, as a function of external pressure Pv and as a function of the air-mass flow determined from an intake pipe model. The formation of the air-mass flow calculated from an intake pipe model occurs in a calculation stage 34, to which is supplied, at the input side, intake pipe pressure Ps, derived from the absolute pressure or external pressure Pv, as well as, optionally, additional auxiliary parameters Hp. The air-mass flow determined from the intake pipe model is thus supplied, via switchover device 12, to calculation stage 27 for determining effective opening surface Fdk of the throttle valve, and derived intake pipe pressure Ps is also supplied, via switchover device 11, to the calculation stage, and absolute pressure or external pressure Pv, present at input 28, is also supplied to the calculation stage. From these quantities, manipulated variable α for the throttle valve is determined in the manner described above. For the determination of intake pipe pressure Ps from absolute pressure Pv, absolute pressure Pv and a desired difference 4 pressure before and after the throttle valve, present at an input 35, are supplied to a subtraction stage 36, at the output of which intake pipe pressure Ps, i.e., the pressure after the throttle valve, is formed.

In SI engines having camshaft actuator (for example, VLC engines), air-mass flow LMb, formed at the output side at calculation stage 23, may also be supplied to calculation stage 27 in place of the air-mass flow determined through the intake pipe model.

In an application of the control device for an engine having direct injection with stratification, or a diesel engine, the injection quantity, i.e., the manipulated quantities for injection time Ti and injection pressure Pf, are determined from the desired quantity of heat WM, and not, as previously described, from measured air-mass flow LM and the λ value. For this purpose, switchover device 10 is reset so that the signal present at the output of division stage 20 for fuel mass KMb to be supplied is present at the input of calculation stage 18, so that manipulated quantities Ti and Pf are determined from this value. Calculation stage 32 is deactivated, or its output signal is not required or used, and the calculation of manipulated variable a for the throttle valve occurs using calculation stage 34 according to the intake pipe model, in the specified manner.

Further types of internal combustion engines or operating modes may be controlled through this control device by setting corresponding switching combinations of switchover devices 10 to 13, or by supplying further input parameters and/or forming further manipulated quantities as needed, determined through corresponding switchover devices and calculation stages. It is of course also possible for different calculation stages to be combined or to be configured as a unified microprocessor, in which case the switchover functions and other upstream or series-connected calculation and conversion stages are also provided by programs of this microprocessor. The overall structure is essential for all cases of application, for example, the taking into account of all operating modes and engine variants by an algorithm.

What is claimed is:

1. An electronic control system for selectively controlling a plurality of types and operating modes of internal combustion engines, comprising:

a calculation device configured to calculate respectively required manipulated variables as a function of respectively required input parameters, the respectively required manipulated variables including a first manipulated variable configured to predetermine a fuel quantity to be injected and a second manipulated variable configured to predetermine a throttle valve position of a throttle valve disposed in an intake pipe, the respectively required input parameters including a desired quantity of heat, the calculation device being configured to predetermine the fuel quantity to be injected selectively as a function of one of a measured air-mass flow and the desired quantity of heat;

a switchover device configured to allocate, in accordance with the operating mode, at least one of the respectively required input parameters and quantities derived therefrom as input parameters to the calculation device; and a conversion device configured to convert the measured air-mass flow value and the desired heat quantity value into corresponding fuel mass values;

wherein the switchover device is configured to be actuated in accordance with the operating mode and is configured to select between fuel mass values as a basis for the calculation of the fuel quantity to be injected.

2. The control system according to claim 1, wherein the calculation device is selectively configured to predetermine one of an injection time and the injection time and an injection pressure.

3. The control system according to claim 1, wherein a fuel/air ratio is supplied to the conversion device to convert the air mass flow values and wherein the conversion device is configured as a division stage.

4. The control system according to claim 1, wherein the calculation device is configured to predetermine the throttle valve position calculated in accordance with an intake pipe model and in accordance selectively with one on the desired quantity of heat and the air-mass flow.

5. The control system according to claim 4, wherein the conversion system is configured to convert the desired quantity of heat into a setpoint air-mass flow and to convert the setpoint air-mass flow into a setpoint intake pipe pressure for calculation of the throttle valve position.

6. The control system according to claim 5, wherein the conversion system is configured to convert the setpoint air-mass flow into the setpoint intake pipe pressure in accordance with a cylinder capacity.

7. The control system according to claim 6, further comprising an operating-mode-dependent switchover system configured to alternatively predetermine one of a constant cylinder capacity and a valve-lift-controlled cylinder capacity.

8. The control system according to claim 6, wherein the calculation system is selectively activatable to predetermine valve control times in accordance with the desired quantity of heat.

9. The control system according to claim 8, wherein the conversion system is configured to convert the desired quantity of heat into the setpoint air-mass flow as an input signal to the calculation system to predetermine the valve control times.

10. The control system according to claim 8, wherein the calculation system is configured to predetermine the valve control times in accordance with the setpoint air-mass flow and at least the intake pipe pressure.

* * * * *

UNITED STATES PATENT AND TRADEMARK OFFICE
CERTIFICATE OF CORRECTION

PATENT NO. : 6,439,196 B1 Page 1 of 1
DATED : August 27, 2002
INVENTOR(S) : Kalweit et al.

It is certified that error appears in the above-identified patent and that said Letters Patent is hereby corrected as shown below:

<u>Title page,</u>
Item [57], ABSTRACT, please delete the last sentence beginning with "The adaptation to the respective type of engine or ...";

<u>Column 6,</u>
Line 13, please delete "with one on the desired" and insert -- with one of the desired --.

Signed and Sealed this

Seventeenth Day of February, 2004

JON W. DUDAS
*Acting Director of the United States Patent and Trademark Office*